United States Patent
Noda et al.

(10) Patent No.: US 7,041,358 B2
(45) Date of Patent: May 9, 2006

(54) HONEYCOMB STRUCTURE AND METHOD FOR PRODUCING THE SAME

(75) Inventors: Naomi Noda, Ichinomiya (JP); Junichi Suzuki, Kuwana (JP)

(73) Assignee: NGK Insulators, Ltd., Nagoya (JP)

( * ) Notice: Subject to any disclaimer, the term of this patent is extended or adjusted under 35 U.S.C. 154(b) by 354 days.

(21) Appl. No.: 10/432,037

(22) PCT Filed: Sep. 18, 2002

(86) PCT No.: PCT/JP02/09546

§ 371 (c)(1),
(2), (4) Date: May 19, 2003

(87) PCT Pub. No.: WO03/024893

PCT Pub. Date: Mar. 27, 2003

(65) Prior Publication Data

US 2004/0037998 A1    Feb. 26, 2004

(30) Foreign Application Priority Data

Sep. 18, 2001  (JP) .............................. 2001-282718

(51) Int. Cl.
*B32B 3/12*    (2006.01)
(52) U.S. Cl. ....................... 428/116; 428/34.4; 428/188
(58) Field of Classification Search ................ 428/116, 428/34.4, 188
See application file for complete search history.

(56) References Cited

U.S. PATENT DOCUMENTS

| | | | |
|---|---|---|---|
| 5,124,303 A * | 6/1992 | Kobayashi et al. | 502/241 |
| 6,242,072 B1 | 6/2001 | Ueda et al. | |

FOREIGN PATENT DOCUMENTS

| | | |
|---|---|---|
| JP | A 2000-51710 | 2/2000 |
| JP | A 2001-199777 | 7/2001 |
| JP | A 2001-226173 | 8/2001 |
| JP | A 2002-121085 | 4/2002 |

* cited by examiner

*Primary Examiner*—Ling X. Xu
(74) *Attorney, Agent, or Firm*—Oliff & Berridge, PLC

(57) ABSTRACT

A honeycomb structure 1 having numerous through channels passing through along the X axis and being partitioned with porous partition walls 2 which is characterized in that: a total pore volume (D) cc/g in end portions of the partition walls 2 is smaller than the total pore volume in other portions of partition walls 2; and relationships between the total pore volume (D) cc/g in end portions and the partition wall thickness (B) μm and cell pitch (C) mm in other portions of partition walls are defined as; the total pore volume (D)≦the partition wall thickness (B)×0.004, and the total pore volume (D)≦(1/the cell pitch (C))×0.18; and a method of producing a honeycomb structure. There is provided with the honeycomb structures 1 having various cell structures and being reinforced at their end portions, with exhibiting satisfactory and practical erosion resistance.

12 Claims, 4 Drawing Sheets

FIG.1(a)
FIG.1(b)
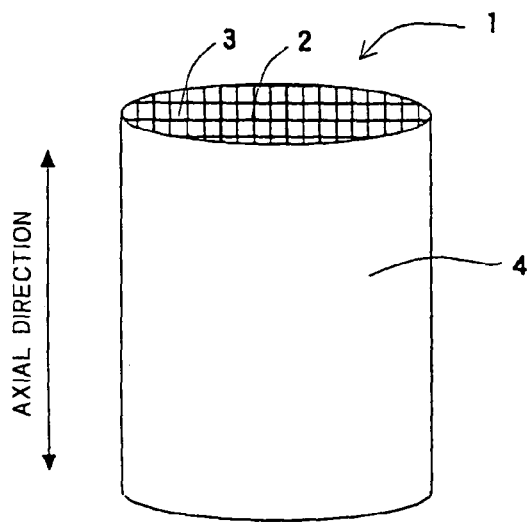
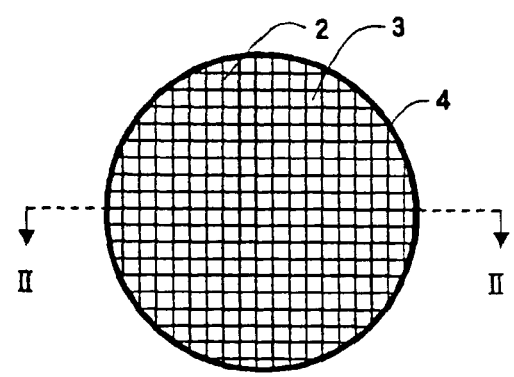
FIG.2(a)
FIG.2(b)
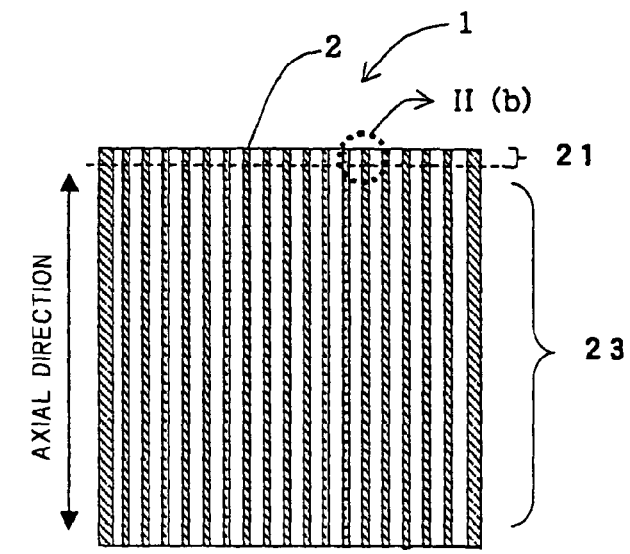
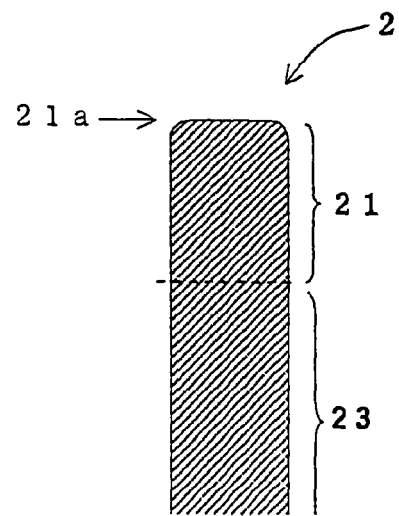

HONEYCOMB STRUCTURE AND METHOD FOR PRODUCING THE SAME

TECHNICAL FIELD

The present invention relates to a honeycomb structure, in particular, a honeycomb structure excellent especially in erosion resistance and suitable especially for devices for purifying automobile engine exhaust gas or the like and a method for producing the same.

BACKGROUND ART

Honeycomb structures are widely used as filters, catalyst carriers, or the like, in particular, as catalyst carriers in devices for purifying the exhaust gas of internal combustion engines such as automobile engines, and filters for purifying the exhaust gas of diesel engines.

When honeycomb structures are used as a carrier for a catalyst or the like in the devices for purifying automobile exhaust gas or the like, it is required to improve the purification performance of the catalysts for purifying exhaust gas in order to meet the exhaust gas regulation tending to be stepped up year by year in consideration of the environmental issues. On the other hand, the directivity toward high mileage and high output power is remarkably observed, and the reduction of the pressure loss is also required, in case of the catalysts for purifying exhaust gas in order to cope with such circumstances, from the viewpoint of the engine development.

Accordingly, in order to solve the above described problems, there is observed such an intensified movement that the partition wall thickness and the circumferential wall thickness of the honeycomb structures are made thinner so that the air permeability is improved and the pressure loss is thereby reduced, and simultaneously the exhaust gas purifying catalysts are reduced in weight and the heat capacities thereof are reduced, and the purifying performance in the warm-up period is thereby improved.

There are problems, due to this thinning mentioned above, that the partition wall strength and circumferential wall strength of the honeycomb structures are lowered, and, in particular, the wear (hereinafter referred to as erosion) of the opening end face exposed to the high-pressure exhaust gas discharged from an engine, namely, the wear of the partition wall end portions becomes severe.

As a measure to solve such problems, for example, JP-A-2000-51710 discloses a honeycomb structure provided with reinforced portions in the partition wall end portions and a production method thereof. In this laid-open specification, there is disclosed a honeycomb structure having an improved strength by thickening and densifying the partition walls, and coating and replacing the partition walls with a reinforcing material. Furthermore, as for the end portions of a honeycomb structure, it has been tried to make the partition walls thicker and denser around the end face by a method wherein a glass material such as glaze or water glass is applied onto the opening end face and firing is made, by a method wherein some particular components of the material composing a honeycomb structure such as cordierite are similarly applied and firing is made, and the like.

Although the above laid-open specification discloses that the end face strength against the pressure applied to the end face is improved by the end face reinforcement as described above, it is not disclosed to what extent the erosion resistance is improved. Moreover, it discloses roughly the relationship between the fundamental wall thickness of a partition wall and the wall thickness of the reinforced portion, however, it fails to carry out any investigation on the relation between the actual erosion resistance and the cell structure of the honeycomb structure, in particular, the cell density, the equivalent cell diameter, the total pore volume or the like; and hence there is a problem that the reinforcement effect is not fully exhibited or the pressure loss increase and heat capacity increase are brought about, depending on the cell structure of the honeycomb structure having the reinforcement applied.

DISCLOSURE OF THE INVENTION

The present invention has been completed in view of the above described circumstances, and an object thereof is the provision of honeycomb structures having various cell structures each capable of exhibiting a satisfactory and practical erosion resistance and a production method thereof.

The present inventors investigated in detail the erosion phenomena, and consequently found that the erosion phenomena was caused not only by the pressure exerted by the exhaust gas onto the end face of the catalyst, but also more frequently by the foreign substances colliding with the end face of the catalyst carrier when foreign substances were generated from the engine and exhaust pipe and came to be mixed in the exhaust gas, and also found the relationships between such erosion phenomena and the partition wall thickness, cell density, equivalent cell diameter, total pore volume, and amount and type of a reinforcing material. Thus, the present inventor came to attain the present invention.

That is, a first aspect of the present invention is the provision of a honeycomb structure which has a large number of through channels passing through in an axial direction thereof and being partitioned by the porous partition walls, and is characterized in that: a total pore volume (D) cc/g in an end portion of an above described partition wall is smaller than the total pore volume in the other portion of the partition wall; and the relationships between the total pore volume (D) cc/g in the end portion of the above described partition wall and the partition wall thickness (B) μm and the cell pitch (C) mm of the other portion of the partition wall are defined as the total pore volume (D)≦the partition wall thickness (B)×0.004, and the total pore volume (D)≦(1/the cell pitch (C))×0.18.

A second aspect of the present invention is the provision of a honeycomb structure which has a large number of through channels passing through in an axial direction thereof and being partitioned by the porous partition walls, and is characterized in that: the end portions of the above described partition walls are reinforced with a reinforcing material; and the mass of the reinforcing material contained is from 5 to 25 parts by mass in relation to 100 parts by mass of the honeycomb structure in the portions to be reinforced prior to the reinforcement.

A third aspect of the present invention is the provision of a honeycomb structure which has a large number of through channels passing through in an axial direction thereof and being partitioned by the porous partition walls, and is characterized in that: the content of phosphorus (P) and/or zirconium (Zr) in the end portions of the above described partition walls is larger than the corresponding content in the other portions of the above described partition walls.

In the present invention, it is preferable that the content of one or, two or more elements selected from the group consisting of phosphorus (P), zirconium (Zr), silicon (Si), aluminum (Al), and titanium (Ti), in the end portions of the partition walls, is larger than the corresponding content in the other portions of the above described partition walls, and it is preferable that the relationship between the difference ($\Delta B$) μm between the partition wall thickness in the end portion of an above described partition wall and the partition wall thickness in the other portion of the above described partition wall and the hydraulic diameter (F) μm of the through channels in the other portion of the above described partition wall is defined as $\Delta B \leq$ the hydraulic diameter (F) of the through channels×0.13.

Moreover, it is preferable that the end portion of a partition wall falls within the portion of 30 mm from the end face of the partition wall, and it is preferable that the relationships between the axial length of the end portion of a partition wall (G) mm and the partition wall thickness of (B) μm and cell pitch (C) mm of the other portion of the partition wall are defined as the axial length of the end portion of the partition wall $(G) \geq (1/\text{the wall thickness}(B)) \times 50$, and the axial length of the end portion of the partition wall $(G) \geq$ the cell pitch $(C) \times 1.0$. Furthermore, it is preferable that the thermal expansion coefficient of the end portion of a partition wall is $4 \times 10^{-6}/°$ C. or less, and it is preferable that the ratio of the thermal expansion coefficient of the end portions of the partition walls to the thermal expansion coefficient of the other portions of the partition walls is 8 or less. Moreover, it is preferable that the above described honeycomb structure of the invention is composed of one, or two or more materials selected from the group consisting of cordierite, alumina, titania, aluminum titanate, zeolite, zirconia, zirconyl phosphate, silicon carbide, and silicon nitride, and it is preferable that the number (H) of the through channels per unit cross sectional area (1 cm$^2$) is 187 or less.

The present invention further provides a method for producing honeycomb structures which have a large number of through channels passing through in an axial direction thereof and being partitioned by the porous partition walls and comprise the reinforced end portions of the partition walls, and which method is characterized in that the method includes a firing process to be conducted after one, or two or more raw reinforcing materials selected from the group consisting of phosphoric acid, aluminum biphosphate, a zirconia sol, a silica sol, a comosite oxide of silica and an alkali metal, an alumina sol, and a titania sol are made to adhere onto the end portions of the partition walls in the honeycomb structures.

The present invention also provides a method for producing the above described honeycomb structures, which method is characterized in that the method includes a firing process to be conducted after one, or two or more raw reinforcing materials selected from the group consisting of phosphoric acid, a zirconia sol, a silica sol, an alumina sol, a titania sol, cordierite scrap powder, talc, alumina, and kaoline, are made adhere.

In the above described methods, it is preferable that the process of adhesion of the raw reinforcing materials is interposed between the forming process of honeycomb structures and the firing process of honeycomb structures, but additionally it is also preferable that a first firing is conducted after the forming process of honeycomb structures, subsequently the above described process of making raw reinforcing materials adhere onto honeycomb structures, and then a second firing is conducted.

BRIEF DESCRIPTION OF THE DRAWINGS

FIG. 1(*a*) is a schematic oblique perspective view showing a mode of a honeycomb structure of the present invention, and FIG. 1(*b*) is a schematic plane view showing a mode of the honeycomb structure of the present invention.

FIG. 2(*a*) is a schematic view of II—II section in FIG. 1(*b*), and FIG. 2(*b*) is an enlarged schematic view of II (b) portion in FIG. 2(*a*).

BEST MODE FOR CARRYING OUT THE INVENTION

Figure 3:
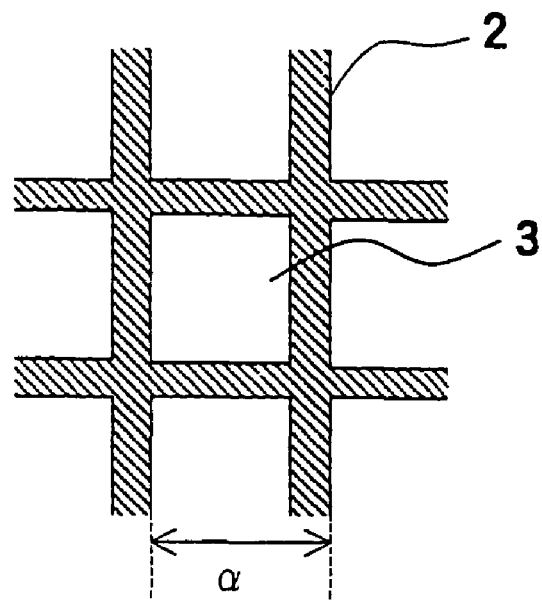
FIG. 3 is an enlarged schematic view of the section in a mode of the honeycomb structure of the present invention.

Description will be made below on the present invention on the basis of the preferred embodiments, but the present invention is not limited by the following embodiments.

FIGS. 1(*a*) and (*b*), and FIGS. 2(*a*) and (*b*) are schematic views showing an embodiment of a honeycomb structure related to the present invention. A honeycomb structure 1 shown in FIGS. 1(*a*) and (*b*) has a large number of through channels 3 passing through in an axial direction thereof and being partitioned by porous partition walls 2. Incidentally, reference numeral 4 in FIGS. 1(*a*) and 1(*b*) denotes a circumferential wall.

The important features of a first aspect of the present invention are; the total pore volume (D) cc/g in an end portion 21 of a partition wall 2 shown in FIGS. 2(*a*) and (*b*) is smaller than the total pore volume in the other portion (hereinafter referred to as the fundamental portion of the partition wall) 23 of the partition wall 2; the relationship between the total pore volume (D) cc/g in the end portion 21 of the partition wall and the wall thickness (B) μm in the fundamental portion 23 of the partition wall is defined as $(D) \leq (B) \times 0.004$, preferably $(D) \leq (B) \times 0.003$, more preferably $(D) \leq (B) \times 0.0025$; and the relationship between the total pore volume (D) cc/g of the end portion 21 of the partition wall and the cell pitch (C) mm of the fundamental portion of the partition wall is defined as $(D) \leq (1/(C)) \times 0.18$, preferably $(D) \leq (1/(C)) \times 0.15$, more preferably $(D) \leq (1/(C)) \times 0.11$.

In the present invention, the total pore volume (D) denotes the total sum of the volumes of the pores per unit mass in the relevant portions of a porous honeycomb structure, and is the value given in cc/g obtained by the mercury intrusion method. The partition wall thickness (B) denotes the average thickness in the fundamental portions 23 of the partition walls and is given in μm. The end portion 21 of a partition wall covers the end face portion and the neighborhood thereof of the partition wall 2, as shown in FIGS. 2(*a*) and (*b*), denotes the portion that should be reinforced, and is the portion of the partition wall which falls in the range preferably from 1 mm or more to 30 mm or less from the end face portion 21*a*, more preferably from 3 mm or more to 15 mm or less, most preferably from 5 mm or more to 10 mm or less. When this range is too small, satisfactory reinforcing effect cannot be obtained, while when this range is too large, the heat capacity is unpreferably increased. The fundamental portion 23 of a partition wall is the portion other than the above described end portion of the partition wall, and denotes the non-reinforced portion of the partition wall. Moreover, the cell pitch denotes the length per through channel 3 in the section of the honeycomb structure 1 as denoted by α in FIG. 3.

In general, the strength is lowered as the partition wall thickness is made thinner, while the strength is increased as the total pore volume is made smaller. From the viewpoint of attaining a practical erosion resistance, when the total pore volume in the end portions 21 of the partition walls is determined, it is necessary to consider not only the partition wall thickness but also the cell pitch; when the total pore volume in the end portions 21 of the partition walls satisfies the above described relationships, a practical erosion resistance can be obtained. In other words, when the total pore volume of the end portions 21 of the partition walls is decreased according to the proportions defined by the above described relationships as the cell pitch is increased, a practical erosion resistance can be obtained. Additionally, as for the absolute value of the total pore volume, when the total pore volume is too small, the adhesive property of the catalyst is unpreferably degraded, while when it is too large, no sufficient reinforcing effect can be obtained. The range of the total pore volume falls within the range preferably from 0.01 to 0.2 cc/g, more preferably from 0.1 to 0.18 cc/g, most preferably from 0.15 to 0.17 cc/g.

The important features of a second aspect of the present invention are as follows: the end portions 21 of the partition walls in the honeycomb structure are reinforced with a reinforcing material; and the reinforcing material is contained in from 5 to 25 parts by mass, more preferably from 10 to 20 parts by mass in relation to 100 parts by mass of the honeycomb structure before reinforcement in the reinforcement portion, namely, the end portions 22 of the partition walls. By making the mass of the reinforcing material be within these ranges, a honeycomb structure can be obtained which exhibits a practical erosion resistance while suppressing the pressure loss increase and the heat capacity increase. When the mass of the reinforcing material is too large, the heat capacity unpreferably becomes too large, while when the mass of the reinforcing material is too small, the reinforcing effect unpreferably becomes insufficient. Additionally, from the similar reason, it is unpreferable that the mass of the reinforcing material relative to the total mass of the honeycomb structure before reinforcement is either too large or too small. The preferable range of the reinforcing material is from 0.5 to 10 parts by mass when the total mass of the honeycomb structure before reinforcement is taken to be 100 parts by mass.

The important feature of a third aspect of the present invention is that the content of phosphorus and/or zirconium in the end portions of the partition walls of the honeycomb structure is larger than the corresponding content in the other portions of the above described partition walls. The erosion resistance in the end portions 21 of the partition walls is improved by making the content of phosphorus alone, the content of zirconium alone, or the content of both of phosphorus and zirconium in the end portions 21 of the partition walls larger than the corresponding content in the fundamental portions 23 of the partition walls. In order to thus increase the content of phosphorus and/or zirconium in the end portions 21 of the partition walls, it is suitable to reinforce the end portions by using as the reinforcing material, for example, the components containing phosphorus and/or zirconium such as phosphoric acid, aluminum biphosphate, a zirconia sol, or the like. Moreover, from the viewpoint of improving the erosion resistance, it is also preferable that in addition to phosphorus and zirconium, the content of one or more than one types of elements selected from silicon (Si), aluminum (Al), and titanium (Ti) is larger than that in the fundamental portions 23 of the partition walls. The content of the above described elements can be made larger in the end portions of the partition walls through reinforcing the end portions by using as the reinforcing material, for example, the materials containing the above described elements such as a silica sol, an alumina sol, and a titania sol.

Figure 4:
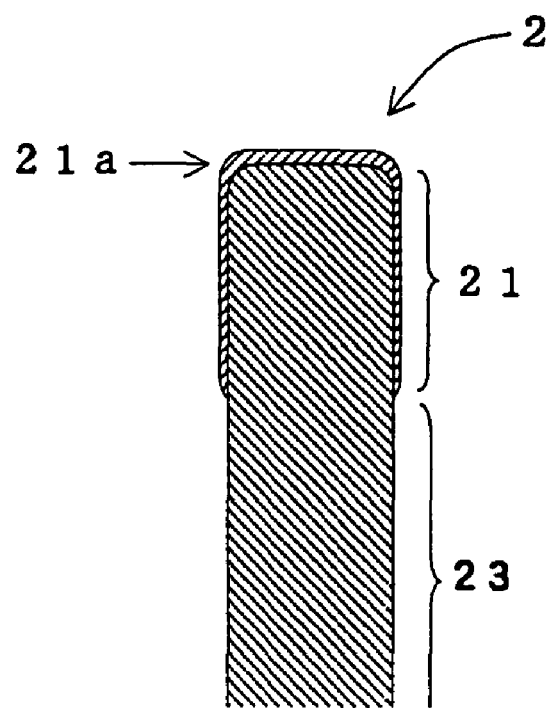
FIG. 4 shows a mode of the present invention, and is an enlarged schematic view of the partition wall portion corresponding to FIG. 2(*b*).

In the present invention, sometimes the partition wall thickness of the reinforced end portions 21 of the partition walls becomes thick by reinforcing the end portions 21 of the partition walls, as shown in FIG. 4. The relationship between the difference ($\Delta B$) μm between the partition wall thickness in the reinforced end portions 21 of the partition walls and the partition wall thickness in the fundamental portions 23 of the partition walls, namely, the thickness of the non-reinforced partition walls, that is, the thickness increment per partition wall due to reinforcement and the hydraulic diameter (F) μm of the through channels in the fundamental portions 23 of the partition walls is given preferably by the relation that $\Delta B \leq (F) \times 0.13$, more preferably by the relation that $\Delta B \leq (F) \times 0.07$. In this connection, the hydraulic diameter is the quantity obtained by dividing the sectional area (p) of a through channel 3 by one-fourth the inside perimeter (q) of the partition wall enclosing the through channel, and is represented by $(F)=(p \times 4)/(q)$. The increment of the pressure loss can be suppressed by making the relation between the reinforcement thickness ($\Delta B$) of the partition walls and the hydraulic diameter in the fundamental portions 23 of the partition walls satisfy the above described relationships, that is, by making the reinforcement thickness of the partition walls thinner in a certain proportion to satisfy the above described relationships as the hydraulic diameter is decreased.

Additionally, the reinforcement thickness remarkably larger than the partition wall thickness before reinforcement not only causes the pressure loss to increase but also induces the break in the boundaries between the reinforced portions and the non-reinforced portions, and hence it is preferable to make the following relationship hold: $\Delta B \leq (B) \times 0.4$, and it is more preferable to make the following relation hold: $\Delta B \leq (B) \times 0.2$.

In the present invention, the axial length (G) mm of the end portion of a partition wall, namely, the reinforcement range falls in the range preferably from 1 mm to 30 mm axially from the end face portion 21a, more preferably from 3 mm to 15 mm, most preferably from 5 mm to 10 mm. In the relationship with the partition wall thickness (B) μm and the cell pitch (C) mm, it is preferable that the axial length (G) mm of the end portion of the partition wall $\geq (1/$ the partition wall thickness (B))$\times 50$, and simultaneously the axial length (G) mm of the end portion of the partition wall$\geq$the cell pitch (C)$\times 1.0$. Furthermore, it is preferable that the axial length (G) mm of the end portion of the partition wall$\geq (1/(B)) \times 150$, and it is preferable that (G)$\geq$(C)$\times 3.5$. In other words, it is preferable that as the partition wall thickness is made thinner, the length of the reinforced end portion of the partition wall is made longer in a certain proportion corresponding to this wall thickness variation, and it is preferable that as the cell pitch is made larger, the length of the reinforced end portion of the partition wall is made longer in a certain proportion corresponding to this cell pitch variation.

Moreover, it is very important that the end portions 21 of the partition walls, particularly, the end face portions 21a of the partition walls to which foreign substances collide directly with a high probability are reinforced without fail. Accordingly, it is preferable to reinforce, as FIG. 4 shows, by applying a reinforcing material onto the top end surfaces of the end face portions 21a of the partition walls, or by the like procedures.

The honeycomb structure of the present invention is the one in which the end portions 21 of the partition walls are reinforced with a reinforcing material, and the thermal expansion coefficient of the end portions 21 of the partition walls is frequently varied owing to the reinforcement of the end portions 21 of the partition walls with a reinforcing material. It is unpreferable that the thermal expansion coefficient of the end portions 21 of the partition walls in the honeycomb structure 1 is too large, because a problem of crack tends to occur owing to thermal stress particularly when the honeycomb structure is used for treatment of automobile exhaust gas or the like. The thermal expansion coefficient of the end portions 21 of the partition walls in the honeycomb structure of the present invention is preferably $4 \times 10^{-6}/°$ C. or less, more preferably $2 \times 10^{-6}/°$ C. or less, most preferably $1.5 \times 10^{-6}/°$ C. or less. Moreover, it is unpreferable that the difference between the thermal expansion coefficient of the end portions 21 of the partition walls and the thermal expansion coefficient of the fundamental portions 23 of the partition walls is too large, because crack tends to occur owing to thermal stress in the boundary portions. The ratio of the thermal expansion coefficient of the end portions 21 of the partition walls to the thermal expansion coefficient of the fundamental portions 23 of the partition walls is preferably not larger than 8, more preferably not larger than 4, most preferably not larger than 3.

As for the honeycomb structure of the present invention, there can be cited a honeycomb structure made of, for example, one or more than one types of materials selected from the group consisting of cordierite, alumina, titania, aluminum titanate, zeolite, zirconia, zirconyl phosphate, silicon carbide, and silicon nitride. When the present invention is applied to, among others, for example, cordierite or the like low in material strength, a high effect of the present invention is attained.

In the present invention, it is unpreferable that the number (H) of the through channels per unit cross sectional area of the honeycomb structure, namely, the cell density is too low, because the strength is degraded, and simultaneously the contact area with the fluid being treated such as exhaust gas is decreased. Additionally, it is unpreferable that the cell density is too high, because the pressure loss is increased. The preferable cell density falls in the range from 0.9 to 233 cells/cm² (from 6 to 1500 cells/square inch). Particularly, the present invention can be suitably applied to a honeycomb structure which is low in cell density and liable to erosion, and it is preferably applied to a honeycomb structure with the cell density of 187 cells/cm² (1200 cells/square inch) or less.

Moreover, the sectional shape of the honeycomb structure of the present invention may be formed into a prescribed shape suitable for the internal shape of the exhaust system to which the honeycomb structure is equipped, and examples of such a shape include a circle, an ellipse, an oblong figure, a trapezium, a trigon, a tetragon, a hexagon, and an irregular shape of left-right asymmetry. Among others, the circle, the ellipse, and the oblong figure are preferable.

Moreover, there is no particular limitation to the sectional shape of the cell used in the present invention, and examples of such a shape include a circular form, a corrugated form, a trigon, and polygons higher than trigon such as a square, a rectangle, and a hexagon. Among others, the trigon, the tetragon, or the hexagon is preferable.

In the present invention, it is unpreferable that the partition wall thickness in the fundamental portions 23 of the partition walls, namely, the partition wall thickness in the non-reinforced portions of the partition walls is too thick, because the pressure loss increase and the heat capacity increase are caused; it is also unpreferable that the above mentioned thickness is too thin, because the strength becomes too low. The above-mentioned thickness preferably falls in the range from 20 to 200 μm. The present invention can yield a remarkable effect particularly when the partition wall thickness is thin, and hence it is particularly preferable that the partition wall thickness of the fundamental portions 23 of the partition walls in the present invention ranges from 20 to 120 μm. With the thickness not larger than 70 μm, a further higher effect can be attained.

Description will be made below on the method of producing the honeycomb structure of the present invention.

For example, a honeycomb structure made of cordierite as a material is produced by the following steps in series: 15 to 25 mass % of graphite as a pore forming agent, and 5 to 15 mass % of PET, PMRA, cross-linked polystyrene, phenolic resin, or the like are added to cordierite-forming raw material prepared by blending talc, kaolin, calcined kaolin, alumina, aluminum hydroxide, and silica in a prescribed proportion so as to make the resulting chemical composition be composed of 42 to 56 mass % of $SiO_2$, 30 to 45 mass % of $Al_2O_3$, and 12 to 16 mass % of MgO; then, methyl cellulose and a surfactant are added in the prescribed amounts, and water is added appropriately and kneaded to obtain a puddle. Then, the puddle is degassed under vacuum; extrusion formed into a honeycomb structure, dried by the dielectric drying or microwave drying method and the hot air drying method. Thereafter, a usual honeycomb structure is produced by performing a first firing process at the highest temperature between 1400 to 1435° C.

In the next step, the end portion of the honeycomb structure produced by the above described method may be reinforced as follows: the end portion is immersed to a prescribed depth into a liquid containing a reinforcing raw material to make the reinforcing raw material adhere the end portion, then taken out, and a second firing is performed, for example, for about one hour at 600° C. In the present invention, it is preferable to use, as a reinforcing raw material, a substance which contains P, Zr, Si, Al, and Ti; phosphoric acid, aluminum biphosphate, a zirconia sol, a silica sol, a composite oxide composed of silica and an alkali metal, an alumina sol, and a titania sol are suitably used in addition to cordierite scrap powder, talc, alumina, and kaoline. Particularly, phosphoric acid, aluminum biphosphate, a zirconia sol, a silica sol, a composite oxide composed of silica and an alkali metal, an alumina sol, and a titania sol are small in grain size and appropriate in viscosity, and hence are suitably used. These substances may be used each alone or in combinations with a plurality of reinforcing raw materials. When a plurality of reinforcing raw materials are combined, a silica sol+cordierite scrap powder or the like are among the suitable combinations. Additionally, when a plurality of reinforcing materials are combined, these materials may be mixed with each other, or may me made to adhere separately and successively. For example, it is a suitable embodiment that a silica sol is first made to adhere onto the part to be reinforced, and then a silica sol+cordierite scrap powder is made to adhere. In this case, after the adhesion of a first reinforcing material, a firing process may be performed in a interposing manner, and successively a second reinforcing material may be made to adhere; in addition, the process interposed between the adhesion processes of the first and second reinforcing materials may be limited to drying, but it is preferable to finally fire to fix the reinforcing materials to the honeycomb structure.

Such a process for reinforcing a honeycomb structure can be performed after a usual honeycomb structure has been produced by the first firing as described above. In this case, handling of the honeycomb structure is easy in the reinforcement process. Additionally, the end portions can be reinforced as follows: a honeycomb structure is immersed into a liquid containing reinforcing raw materials to make the reinforcing raw materials adhere, after the forming of a honeycomb structure and before the firing, as described above, and then the honeycomb structure is taken out and fired. In this case, the merit is that the firing process can be finished only once.

In case where the liquid containing the reinforcing material is made to adhere to the formed honeycomb structure after the forming of the honeycomb structure and before the firing, it is preferable that the adhering liquid is water insoluble when a water soluble forming aid is used during forming of the honeycomb structure, but on the contrary the adhering liquid is water soluble when a water insoluble forming aid is used during forming of the honeycomb structure, because the formed body can be prevented from deformation during the adhesion operation. As for the adhering liquid, a reinforcing material or various liquids containing the components constituting the reinforcing material, for example, aqueous solutions thereof or the like may be used; in the case where the reinforcing material is powdery, a suspension (slurry) obtained by mixing the reinforcing material with a liquid substance such as solvents may also be used. Furthermore, it is preferable that a sol or the like containing the reinforcing material is used, because the following advantages are attained: a viscosity suitable for adhesion is obtained; the penetrability into the pores and adhesion to surfaces are high; and the firing can be made at a relatively low temperature of 200 to 800° C. The viscosity of the liquid containing the reinforcing material ranges preferably from 2 to 20,000 cps, more preferably from 5 to 200 cps. With the viscosity not larger than 2 cps, the adhesion amount is decreased and there occur the following problems: the reinforcing effect comes short; the number of repeated adhesion operations is increased; or the like. On the contrary, with the viscosity exceeding 20,000 cps, clogging tends to occur during the adhesion operation. Furthermore, in the case where the reinforcing material is powdery, it is preferable to make the average grain size 20 µm or less, because satisfactory adhesion to the honeycomb structure can be obtained. Furthermore, it is preferable to make the average grain size 5 µm or less, because the penetrability of the reinforcing material powder into the pores is enhanced.

When firing of the reinforcing material is separately performed, namely, the reinforcing raw material is made to adhere after the honeycomb structure has been produced by the first firing, and then the second firing is performed, the temperature for the second firing is preferably the temperature for firing the honeycomb structure or less. When the temperature for the second firing is too high, in addition to the cost problems that the firing apparatus becomes large in scale and energy consumption is large, there is a possibility that the honeycomb structure is melted to be broken, or damaged, while when the temperature for firing is too low, sufficient reinforcement cannot be attained. The preferable temperature for the second firing is from 200 to 900° C.

EXAMPLES AND COMPARATIVE EXAMPLES

The present invention will be explained more specifically below on the basis of Examples; however, the present invention is not restricted to these Examples. Incidentally, in the following Examples, the percentages in the composition ratios signify mass % unless otherwise specified.

Production of Honeycomb Structures

After weighing prescribed amounts of raw material powders of talc, kaoline, and aluminum hydroxide, 8% of hydroxypropylmethyl cellulose, 0.5% of lauric acid potassium soap, 2% of polyether, and 28% of water were mixed thereto with respect to the total of those materials as 100%, using a mixer. Then, the obtained mixture was charged into a continuous forming machine, and formed into a honeycomb structure. The structure was cut to the prescribed dimension, and fired while maintained at the highest temperature of 1430° C. for 4 hours, to give a honeycomb structure A in which the partition wall thickness was 51 µm (2 mil) and the cell density was 139.5 cells/cm$^2$ (900 cells/square inch). Similarly, there were obtained a honeycomb structure B in which the partition wall thickness was 102 µm (4 mil) and the cell density was 93 cells/cm$^2$ (600 cells/square inch), and a honeycomb structure C in which the partition wall thickness was 102 µm and the cell density was 54.3 cells/cm$^2$ (350 cells/square inch).

Examples 1 to 6

The one end face of the honeycomb structure A was immersed in a silica sol at the prescribed depth, and then the immersed end face was maintained to be the bottom side and the surplus liquid remaining in the cells was blown away by applying compressed air from the other end face. When the reinforcing material amount did not reach the prescribed amount through the above-described operation, the above operation was repeatedly performed until it reached the prescribed amount. The honeycomb structure with the reinforcing material made to adhere by the above operation was fired at 600° C. for one hour, and a honeycomb structure was obtained in which the end portions of the partition walls have the prescribed total pore volume (D), reinforcement thickness (ΔB) (inclusive of the both sides of the partition wall), reinforcement mass, end portion length (G), and thermal expansion coefficient, all shown in Table 1. Incidentally, the adjustment of the total pore volume, reinforcement thickness, and reinforcement mass was performed by varying the number of the immersing operations and the viscosity and grain size of a silica sol. Moreover, the thermal expansion coefficients were measured using the specimens cut out, along the direction perpendicular to the axis, from the end portions of the honeycomb structures, in the temperature range of from 40° C. to 800° C. with a thermodilatometer (Rigaku, Corp., high precision two specimen thermoanalyzer).

(Measurement of the Total Pore Volumes)

The total pore volumes were measured by using a porosimeter (Micromeritics, AutoPore 9220) according to the following procedures.

Measurement Procedures (1) A specimen of 0.1 g or more was cut out from a honeycomb structure.

(2) The specimen was dried at 150° C. for 2 hours, and then put into a container and the container was set in the apparatus.

(3) Mercury was intruded into the container by exerting a pressure of 68.6 MPa (700 kgf/cm$^2$), and the mercury volume absorbed by the specimen was measured, from which the total pore volume was calculated.

(Evaluation of the Erosion Resistance)

Figure 5:
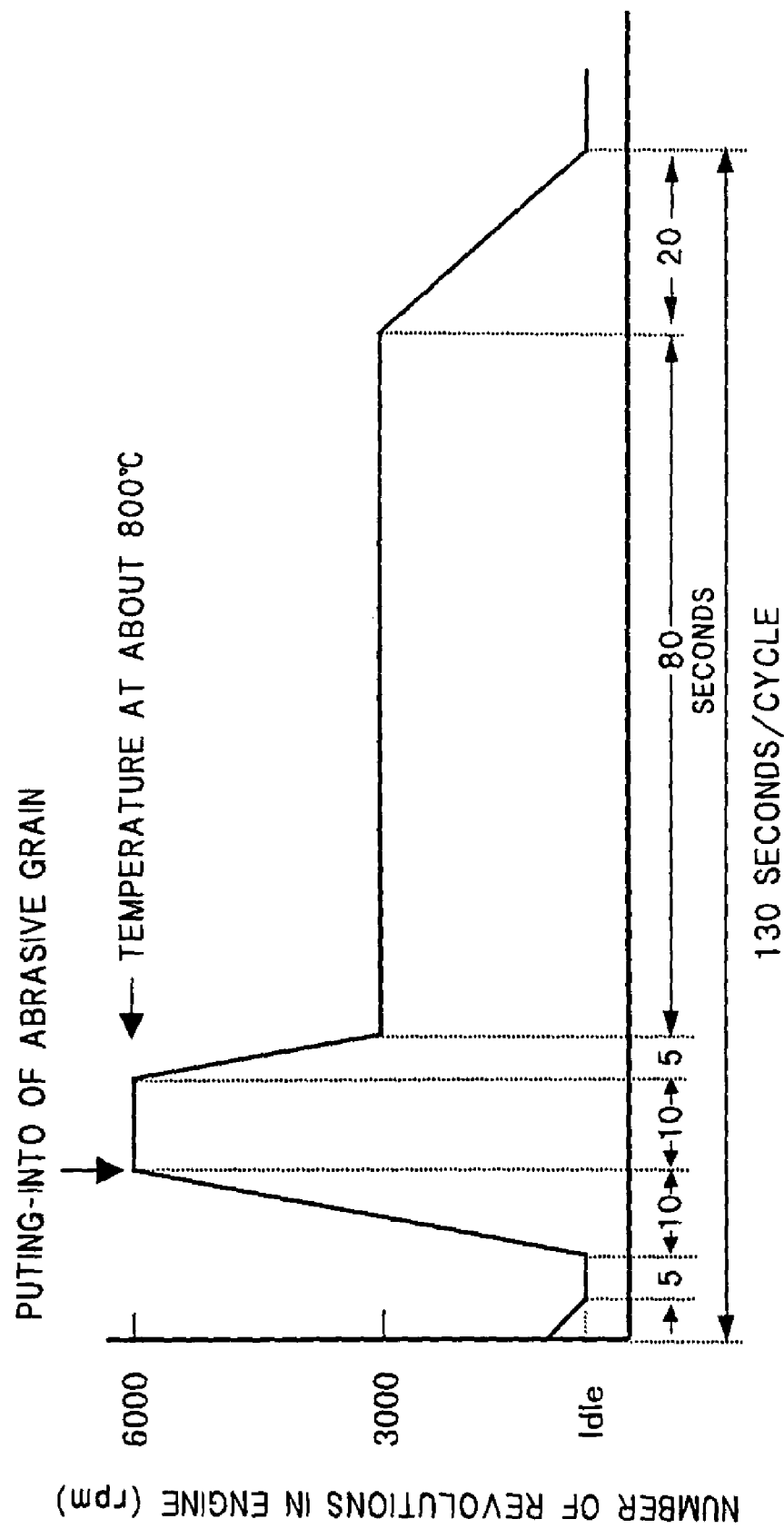
FIG. 5 is a graph showing the number of revolutions of the engine in an erosion test.

The honeycomb structures obtained in Examples 1 to 6 and the honeycomb structure A itself with non-reinforced end portions as Comparative Example 1 were held and housed in metallic cans, and the cans were connected to the exhaust port of an in-line four-cylinder gasoline engine with 1.8 liter displacement. More specifically, the samples were arranged immediately close to the engine. Then, under the conditions shown in FIG. 5, the engine was operated, and 0.1 g of an abrasive grain (silicon carbide, average grain size 50 μm) was put into the exhaust gas port located upstream the honeycomb structure when the number of revolutions reached 6,000 rpm. Furthermore, the engine was operated continuously under the conditions shown in FIG. 5, and charging of the abrasive grain was made one time every 2 cycles and this charging operation was continuously repeated, with one cycle taking 130 seconds. The test were performed several times while the total charge amount of the abrasive grain was varied to the extent ranging from about 2 g to the order of 16 g. From the results thus obtained, the erosion magnitude (wind erosion volume) of a honeycomb structure for the abrasive grain charge amount of 10 g was calculated.

Figure 6:
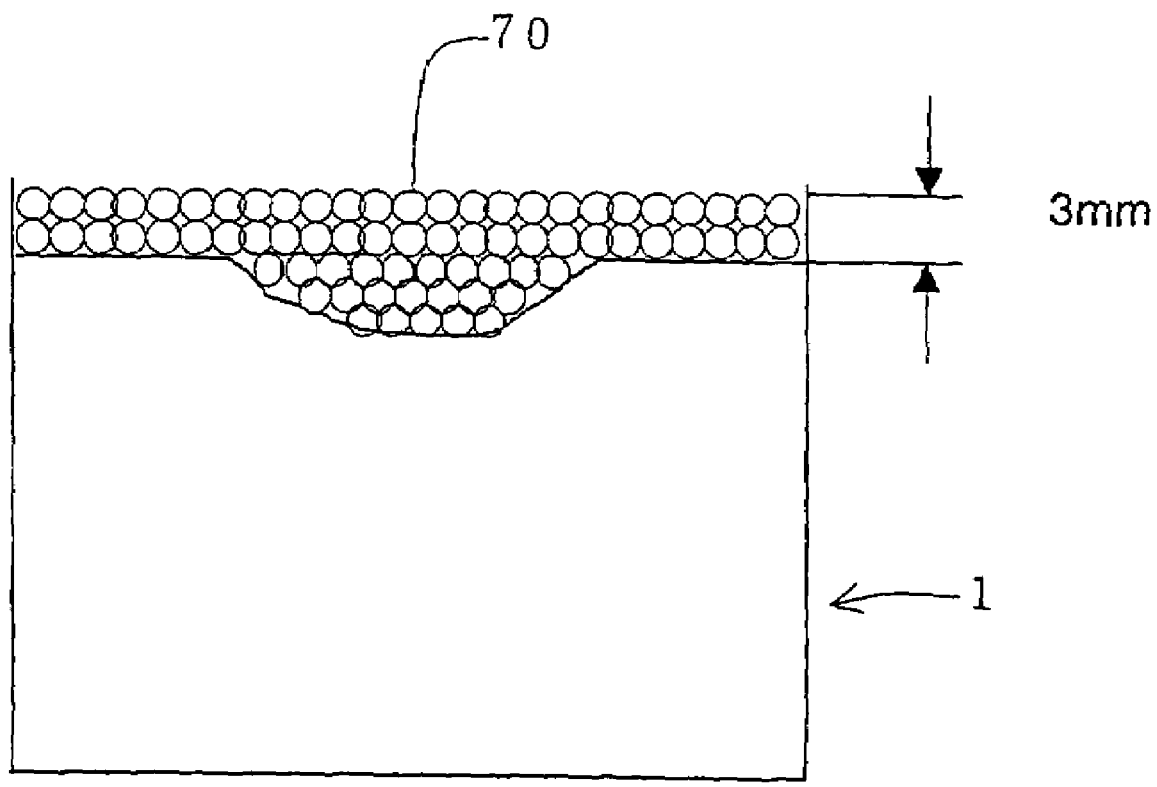
FIG. 6 is a view schematically illustrating a method of measuring the magnitude of erosion.

The erosion magnitude was determined, as shown in FIG. 6, a rubber sheet was wound around the processed end surface of the honeycomb structure 1 for which surface the erosion magnitude was to be measured, ceramic beads 70 of 1.5 mm in diameter were packed thereinto up to the height of about 3 mm, and then the beads were recovered and the total volume of the beads was measured, and an erosion magnitude was determined from the difference between the total bead volumes thus determined after and before the erosion test. The erosion magnitude is given as an average magnitude after three times repetition.

The results are shown in Table 1. As described above, a silica sol has an appropriate viscosity and an appropriate grain size, and simultaneously allows for the viscosity and grain size to be adjusted, and accordingly the use of a silica sol permitted appropriate reinforcing of the end portions. As compared with Comparative Example 1, the samples of Examples 1 to 6 are smaller in erosion magnitude, and exhibit satisfactory erosion resistances. Moreover, the total pore volume in the end portions of Example 4 deviates from the scope specified by the first aspect of the present invention, and the reinforcement mass of Example 4 also deviates from the range specified by the second aspect of the present invention. Thus, Example 4 is to be placed as a comparative example in relation to Examples 1 to 3 and Examples 5 and 6 falling within the scopes specified by the first and second aspects of the present invention. As for the comparison of these examples, Examples 1 to 3 and Examples 5 and 6 exhibit satisfactory erosion resistances as compared to Example 4. Incidentally, in Tables 1 to 5, the reinforcement masses indicate the parts by mass of the reinforced portions in relation to 100 parts by mass of the honeycomb structure before reinforcement in the reinforced portions.

TABLE 1

|  | Example 1 | Example 2 | Example 3 | Example 4 | Example 5 | Example 6 | Comparative Example 1 |
| --- | --- | --- | --- | --- | --- | --- | --- |
| Fundamental properties of honeycomb structure |  |  |  |  |  |  |  |
| Partition wall thickness (B), μm | 51 | 51 | 51 | 51 | 51 | 51 | 51 |
| Cell density, number of cells/cm$^2$ | 139.5 | 139.5 | 139.5 | 139.5 | 139.5 | 139.5 | 139.5 |
| Cell pitch (C), mm | 0.847 | 0.847 | 0.847 | 0.847 | 0.847 | 0.847 | 0.847 |
| Hydraulic diameter (F), μm | 796 | 796 | 796 | 796 | 796 | 796 | 796 |
| Total pore volume in fundamental portion, cc/g | 0.24 | 0.24 | 0.24 | 0.24 | 0.24 | 0.24 | 0.24 |
| Thermal expansion coefficient × 10$^6$, 1/° C. | 0.5 | 0.5 | 0.5 | 0.5 | 0.5 | 0.5 | 0.5 |
| Properties of end portion |  |  |  |  |  |  |  |
| Reinforcing material | Silica sol | Silica sol | Silica sol | Silica sol | Silica sol | Silica sol | — |
| Total pore volume (D), cc/g | 0.10 | 0.14 | 0.17 | 0.22 | 0.14 | 0.20 | 0.24 |
| (B) × 0.004 | 0.204 | 0.204 | 0.204 | 0.204 | 0.204 | 0.204 | 0.204 |
| (1/(C)) × 0.18 | 0.213 | 0.213 | 0.213 | 0.213 | 0.213 | 0.213 | 0.213 |
| Reinforcement thickness (ΔB), μm | 10 | 10 | 10 | 2 | 60 | 3 | — |
| (F) × 0.13 | 103 | 103 | 103 | 103 | 103 | 103 | 103 |
| Reinforcement mass, parts by mass | 20 | 15 | 10 | 1 | 50 | 3 | — |
| Reinforcing material component | Si | Si | Si | Si | Si | Si | — |
| Length of end portion (G), mm | 5 | 5 | 5 | 5 | 5 | 5 | — |
| Thermal expansion coefficient × 10$^6$, 1/° C. | 1.7 | 1.4 | 1.1 | 0.8 | 2.2 | 0.9 | 0.5 |
| Erosion magnitude, cm$^3$ | 0.4 | 0.7 | 1.2 | 4.3 | 0.8 | 3.1 | 5.2 |

Honeycomb structure A was used.

Example 7

By using aluminum biphosphate as the reinforcing raw material, the end portions were reinforced in a manner similar to that in Example 1 to give a honeycomb structure having the characteristics shown in Table 2.

Example 8

By using an aqueous solution containing zirconium as the reinforcing raw material, the end portions were reinforced in a manner similar to that in Example 1 to give a honeycomb structure having the characteristics shown in Table 2.

Example 9

By using an aqueous solution containing chromium as the reinforcing raw material, the end portions were reinforced in a manner similar to that in Example 1 to give a honeycomb structure having the characteristics shown in Table 2.

Example 10

By setting the reinforcement length of the end portions, namely, the depth for immersing into the reinforcing raw material at 0.5 mm, the end portions were reinforced in a manner similar to that in Example 1 to give a honeycomb structure having the characteristics shown in Table 2.

Example 11

By setting the reinforcement length of the end portions, namely, the depth for immersing into the reinforcing raw material at 2.5 mm, the end portions were reinforced in a manner similar to that in Example 1 to give a honeycomb structure having the characteristics shown in Table 2.

Example 12

By using an alumina sol as the reinforcing raw material, the end portions were reinforced in a manner similar to that in Example 1 to give a honeycomb structure having the characteristics shown in Table 2.

Example 13

The honeycomb structure B was used, and the end portions thereof were reinforced in a manner similar to that in Example 1 to give a honeycomb structure having characteristics shown in Table 2.

On the honeycomb structures obtained in Examples 7 to 13, the erosion evaluation similar to that described above was performed, and the results obtained were shown in Table 2 together with the result for Comparative Example 1. Anyone of the samples of Examples 7 to 13 exhibited satisfactory erosion resistances, as compared to the sample of Comparative Example 1. Example 7 in which aluminum biphosphate was used as the reinforcing raw material exhibited a very satisfactory erosion resistance. Example 8 in which an aqueous solution containing zirconium was used as the reinforcing raw material also exhibited a satisfactory erosion resistance. Example 9 exhibited a more satisfactory erosion resistance than that in Comparative Example 1; however, since Example 9 used Cr as the reinforcing material, it exhibited a lower erosion resistance than those in Example 7 wherein aluminum biphosphate was used, Example 8 wherein an aqueous solution containing zirconium was used, and Example 2 (Table 1) wherein a silica sol was used. Examples 10 and 11 are the same in reinforcing material mass but are respectively 0.5 mm and 2.5 mm in the end portion length, namely, the reinforcement length, to be compared with Example 2 which is the same in reinforcing material mass but is 5 mm in the end portion length; Examples 11 and Example 2 which are respectively 2.5 mm and 5 mm in the end portion length exhibited a very satisfactory erosion resistance. Example 12 wherein an alumina sol was used as the reinforcing raw material also exhibited a satisfactory erosion resistance. Example 13 which used the honeycomb structure B exhibited a satisfactory erosion resistance; however, Example 2 having a thinner partition wall thickness was revealed to exhibit a more remarkable effect.

TABLE 2

|  | Example 7 | Example 8 | Example 9 | Example 10 | Example 11 | Example 12 | Example 13 | Comparative Example 1 |
|---|---|---|---|---|---|---|---|---|
| Fundamental properties of honeycomb structure |  |  |  |  |  |  |  |  |
| Partition wall thickness (B), µm | 51 | 51 | 51 | 51 | 51 | 51 | 51 | 51 |
| Cell density, number of cells/cm$^2$ | 139.5 | 139.5 | 139.5 | 139.5 | 139.5 | 139.5 | 93 | 139.5 |
| Cell pitch (C), mm | 0.847 | 0.847 | 0.847 | 0.847 | 0.847 | 0.847 | 1.03 | 0.847 |
| Hydraulic diameter (F), µm | 796 | 796 | 796 | 796 | 796 | 796 | 928 | 796 |
| Total pore volume in fundamental portion, cc/g | 0.24 | 0.24 | 0.24 | 0.24 | 0.24 | 0.24 | 0.24 | 0.24 |
| Thermal expansion coefficient × 10$^6$, 1/° C. | 0.5 | 0.5 | 0.5 | 0.5 | 0.5 | 0.5 | 0.5 | 0.5 |
| Properties of end portion |  |  |  |  |  |  |  |  |
| Reinforcing material | Aluminum bi-phosphate | Aqueous solution containing Zr | Aqueous solution containing Cr | Silica sol | Silica sol | Alumina sol | Silica sol | — |
| Total pore volume (D), cc/g | 0.14 | 0.17 | 0.14 | 0.14 | 0.14 | 0.14 | 0.17 | 0.24 |
| (B) × 0.004 | 0.204 | 0.204 | 0.204 | 0.204 | 0.204 | 0.204 | 0.204 | 0.204 |
| (1/(C)) × 0.18 | 0.213 | 0.213 | 0.213 | 0.213 | 0.213 | 0.213 | 0.175 | 0.213 |
| Reinforcement thickness (ΔB), µm | 10 | 5 | 10 | 10 | 10 | 10 | 12 | — |
| (F) × 0.13 | 103 | 103 | 103 | 103 | 103 | 103 | 121 | 103 |
| Reinforcement mass, parts by mass | 15 | 15 | 15 | 15 | 15 | 15 | 10 | — |
| Reinforcing material component | P, Al | Zr | Cr | Si | Si | Al | Si | — |
| Length of end portion (G), mm | 5 | 5 | 5 | 0.5 | 2.5 | 5 | 5 | — |
| Thermal expansion coefficient × 10$^6$, 1/° C. | 1.5 | 1.3 | 1.3 | incapable measurement | 1.4 | 3.5 | 1.1 | 0.5 |
| Erosion magnitude, cm$^3$ | 0.3 | 0.9 | 2.8 | 2.5 | 0.9 | 0.7 | 1.1 | 5.2 |

Only Example 12 used the honeycomb structure B. Others used the honeycomb structure A.

Example 14

By using a mixture composed of a silica sol and cordierite scrap powder as the reinforcing raw material, the end portions were reinforced in a manner similar to that in Example 1 to give a honeycomb structure having the characteristics shown in Table 3.

Example 15

By using a mixture composed of a silica sol and zeolite as the reinforcing raw material, the end portions were reinforced in a manner similar to that in Example 1 to give a honeycomb structure having the characteristics shown in Table 3.

Example 16

A honeycomb structure was formed in a manner similar to that in Example 1, and cut to the prescribed dimension. Then, before firing, the one side face of the honeycomb structure was immersed to a prescribed depth into a silica sol to reinforce the end portions to a prescribed amount in a manner similar to that in Example 1. Subsequently the honeycomb structure was dried and fired to give a honeycomb structure having the characteristics shown in Table 3.

The erosion resistances were evaluated for the honeycomb structures obtained in Examples 14 to 16 in a manner similar to that in Example 1, and the results obtained are shown in Table 3 together with the result for Comparative Example 1.

Examples 14 and 15 each used a mixture as the reinforcing raw material; however, even by using the mixture, a satisfactory erosion resistance property was exhibited. Furthermore, in Example 16, the honeycomb structure was produced on the basis of the reinforcement method with one step firing; however, even by using this method, a satisfactory erosion resistance was exhibited.

Example 18

The end portions were reinforced in a manner similar to that in Example 17 except that the reinforcement thickness ($\Delta B$) was made to be 1 μm and the reinforcement mass was made to be 4 parts by mass; thus the honeycomb structure having the characteristics shown in Table 4 was obtained.

Comparative Example 2

The end portions were reinforced in a manner similar to that in Example 17 except that the total pore volume (D) and reinforcement mass of the end portions were respectively made to be 0.17 cc/g and 4 parts by mass; thus the honeycomb structure having the characteristics shown in Table 4 was obtained.

Example 17 falls within the scopes specified by the first and second aspects of the present invention, and exhibited a very satisfactory erosion resistance. Example 18 falls within the scope of the first aspect of the present invention, but does not fall within the scope of the second aspect of the present invention, and exhibited a satisfactory erosion resistance although somewhat inferior to the erosion resistance found for the honeycomb structure of Example 17. Comparative Example 2 falls neither within the scope of the first aspect of the present invention nor within the scope of the second aspect, and exhibited significant erosion although the reinforcement mass was the same as that in Example 17, and

TABLE 3

|  | Example 14 | Example 15 | Example 16 | Comparative Example 1 |
|---|---|---|---|---|
| Fundamental properties of honeycomb structure | | | | |
| Partition wall thickness (B), μm | 51 | 51 | 51 | 51 |
| Cell density, number of cells/cm$^2$ | 139.5 | 139.5 | 139.5 | 139.5 |
| Cell pitch (C), mm | 0.847 | 0.847 | 0.847 | 0.847 |
| Hydraulic diameter (F), μm | 796 | 796 | 796 | 796 |
| Total pore volume in fundamental portion, cc/g | 0.24 | 0.24 | 0.24 | 0.24 |
| Thermal expansion coefficient × 10$^6$, 1/° C. | 0.5 | 0.5 | 0.5 | 0.5 |
| Properties of end portion | | | | |
| Reinforcing material | Silica sol + cordierite scrap powder | Silica sol + zeolite | Silica sol | — |
| Total pore volume (D), cc/g | 0.15 | 0.15 | 0.20 | 0.24 |
| (B) × 0.004 | 0.204 | 0.204 | 0.204 | 0.204 |
| (1/(C)) × 0.18 | 0.213 | 0.213 | 0.213 | 0.213 |
| Reinforcement thickness ($\Delta B$), μm | 13 | 15 | 13 | — |
| (F) × 0.13 | 103 | 103 | 103 | 103 |
| Reinforcement mass, parts by mass | 15 | 15 | 15 | — |
| Reinforcing material component | Si, Mg, Al | Si, Al | Si | — |
| Length of end portion (G), mm | 5 | 5 | 5 | — |
| Thermal expansion coefficient × 10$^6$, 1/° C. | 1.2 | 1.2 | 1.2 | 0.5 |
| Erosion magnitude, cm$^3$ | 1.0 | 2.7 | 2.2 | 5.2 |

Honeycomb structure A was used.

Example 17

The honeycomb structure C was used, and the end portions thereof were reinforced in a manner similar to that in Example 1 to give a honeycomb structure having characteristics shown in Table 4.

thus exhibited a poor erosion resistance. Incidentally, Comparative Example 2 is within the scope of the present invention of the production method since a silica sol is used as a reinforcing material, and the effect of the present invention of the production method was attained in view of the reinforcement attained easily; however, Comparative Example 2 is given as a comparative example for easier comparison of the effects between the first and second aspects of the present invention.

TABLE 4

|  | Example 17 | Example 18 | Comparative Example 2 |
|---|---|---|---|
| Fundamental properties of honeycomb structure | | | |
| Partition wall thickness (B), μm | 102 | 102 | 102 |
| Cell density, number of cells/cm$^2$ | 54.3 | 54.3 | 54.3 |
| Cell pitch (C), mm | 1.37 | 1.37 | 1.37 |
| Hydraulic diameter (F), μm | 1270 | 1270 | 1270 |
| Total pore volume in fundamental portion, cc/g | 0.24 | 0.24 | 0.24 |
| Thermal expansion coefficient × 10$^6$, 1/° C. | 0.5 | 0.5 | 0.5 |
| Properties of end portion | | | |
| Reinforcing material | Silica sol | Silica sol | Silica sol |
| Total pore volume (D), cc/g | 0.1 | 0.1 | 0.17 |
| (B) × 0.004 | 0.408 | 0.408 | 0.408 |
| (1/(C)) × 0.18 | 0.131 | 0.131 | 0.131 |
| Reinforcement thickness (ΔB), μm | 10 | 1 | 10 |
| (F) × 0.13 | 165 | 165 | 165 |
| Reinforcement mass, parts by mass | 10 | 4 | 4 |
| Reinforcing material component | Si | Si | Si |
| Length of end portion (G), mm | 5 | 5 | 5 |
| Thermal expansion coefficient × 10$^6$, 1/° C. | 1.4 | 1.2 | 1.0 |
| Erosion magnitude, cm$^3$ | 0.5 | 0.7 | 4.5 |

Honeycomb structure C was used.

Example 19

In a manner similar to those in Examples 1 to 6, a honeycomb structure was obtained in which the reinforcement thickness (ΔB) of the end portions of the partition walls was 30 μm and which has the characteristics shown in Table 5.

Example 20

In a manner similar to those in Examples 1 to 6, a honeycomb structure was obtained in which the reinforcement thickness (ΔB) of the end portions of the partition walls was 110 μm and which has the characteristics shown in Table 5.

The erosion resistances were measured for the samples obtained in the above described Examples 19 and 20, and the pressure losses of Examples 19 and 20, and Examples 2 and 5 were measured at room temperature by passing the gas through the whole end face area of a honeycomb structure with a blower-suction pressure loss measurement apparatus. The results obtained are shown in Table 5. Any of these samples exhibited a satisfactory erosion resistance, and the samples obtained in Examples 19, 5, and 20 each showed a tendency to exhibit increasing pressure loss as compared to Example 2, as the reinforcement thickness was increased with increasing reinforcement mass. Moreover, the sample obtained in Example 20 exhibited the largest pressure loss because the reinforcement thickness (ΔB) itself was increased.

TABLE 5

|  | Example 2 | Example 19 | Example 5 | Example 20 |
|---|---|---|---|---|
| Fundamental properties of honeycomb structure | | | | |
| Partition wall thickness (B), μm | 51 | 51 | 51 | 51 |
| Cell density, number of cells/cm$^2$ | 139.5 | 139.5 | 139.5 | 139.5 |
| Cell pitch (C), mm | 0.847 | 0.847 | 0.847 | 0.847 |
| Hydraulic diameter (F), μm | 796 | 796 | 796 | 796 |
| Total pore volume in fundamental portion, cc/g | 0.24 | 0.24 | 0.24 | 0.24 |
| Thermal expansion coefficient × 10$^6$, 1/° C. | 0.5 | 0.5 | 0.5 | 0.5 |
| Properties of end portion | | | | |
| Reinforcing material | Silica sol | Silica sol | Silica sol | Silica sol |
| Total pore volume (D), cc/g | 0.14 | 0.14 | 0.14 | 0.14 |
| (B) × 0.004 | 0.204 | 0.204 | 0.204 | 0.204 |
| (1/(C)) × 0.18 | 0.213 | 0.213 | 0.213 | 0.213 |
| Reinforcement thickness (ΔB), μm | 10 | 30 | 60 | 110 |
| (F) × 0.13 | 103 | 103 | 103 | 103 |
| Reinforcement mass, parts by mass | 15 | 35 | 50 | 80 |
| Reinforcing material component | Si | Si | Si | Si |
| Length of end portion (G), mm | 5 | 5 | 5 | 5 |
| Thermal expansion coefficient × 10$^6$, 1/° C. | 1.4 | 1.9 | 2.2 | 3.1 |
| Erosion magnitude, cm$^3$ | 0.4 | 0.8 | 0.8 | 0.6 |

TABLE 5-continued

|  | Example 2 | Example 19 | Example 5 | Example 20 |
|---|---|---|---|---|
| Pressure loss (kPa) | | | | |
| Flux: 3 (Nm³/min) | 0.6 | 0.7 | 0.8 | 1.1 |
| Flux: 5 (Nm³/min) | 1.2 | 1.3 | 1.6 | 2.2 |
| Flux: 7 (Nm³/min) | 1.9 | 2.2 | 2.6 | 3.5 |
| Flux: 9 (Nm³/min) | 2.7 | 3.1 | 3.7 | 5.0 |

INDUSTRIAL APPLICABILITY

As described above, the honeycomb structure according to the present invention is reinforced in the end portions for the prescribed range, and hence exhibits a satisfactory erosion resistance. Additionally, the honeycomb structure produced by the production method of the present invention is satisfactorily reinforced in the end portions and exhibits a satisfactory erosion resistance. Accordingly, the honeycomb structure of the present invention can be suitably used as filters, catalyst carriers, in particular, the catalyst carrier in the exhaust gas purifying device for an internal engine such as an automobile engine, the exhaust gas purifying filter for a diesel engine, or the like.

The invention claimed is:

1. A honeycomb structure which has a large number of through channels passing through in an axial direction thereof and being partitioned with porous partition walls, characterized in that a total pore volume (D) cc/g of end portions of said partition walls is smaller than total pore volume in other portions of said partition walls, and relationships between the total pore volume (D) cc/g in said end portions of the partition walls and a partition wall thickness (B) μm and a cell pitch (C) mm in the other portions of said partition walls are defined as:

the total pore volume (D)≦the partition wall thickness (B)×0.004; and the total pore volume (D)≦(1/the cell pitch (C))×0.18.

2. The honeycomb structure according to claim 1, characterized in that end portions of the partition walls contain at least one element selected from the group consisting of phosphorus (P), zirconium (Zr), silicon (Si), aluminum (Al), and titanium (Ti) in a higher content than other portions of said partition walls do.

3. The honeycomb structure according to claim 1, characterized in that a relation between a difference (ΔB) μm between the partition wall thickness in the end portions of the partition walls and the partition wall thickness in the other portions of said partition walls and a hydraulic diameter (F) μm of the through channels in the other portions of said partition walls is defined as:

ΔB≦the hydraulic diameter (F)×0.13.

4. The honeycomb structure according to claim 1, characterized in that the end portions of the partition walls are the portions within 30 mm from the end faces of the partition walls.

5. The honeycomb structure according to claim 1, characterized in that relationships between an axial length (G) mm of the end portions of the partition walls and the partition wall thickness (B) μm and a cell pitch (C) mm of the other portions of the partition walls are defined as:

the axial length of the end portions of the partition walls (G)≧(1/(the partition wall thickness (B))×50; and the axial length of the end portions of the partition walls (G)≧the cell pitch (C)×1.0.

6. The honeycomb structure according to claim 1, characterized in that the end portions of the partition walls has a thermal expansion coefficient of $4 \times 10^{-6}$/°C. or less.

7. The honeycomb structure according to claim 6, characterized in that the ratio of the thermal expansion coefficient in the end portions of the partition walls to the thermal expansion coefficient in the other portions of the partition walls is 8 or less.

8. The honeycomb structure according to claim 1, characterized in that the honeycomb structure is made of at least one material selected from the group consisting of cordierite, alumina, titania, aluminum titanate, zeolite, zirconia, zirconyl phosphate, silicon carbide, and silicon nitride.

9. The honeycomb structure according to claim 1, characterized in that number (H) of through channels per unit cross sectional area (1 cm²) of the honeycomb structure is 187 or less.

10. A honeycomb structure which has a large number of through channels passing through in an axial direction thereof and being partitioned with porous partition walls, characterized in that end portions of said partition walls are reinforced with a reinforcing material, and 5 to 25 parts by mass of said reinforcing material are contained in relation to 100 parts by mass of the honeycomb structure before reinforcement in the reinforcement portions;

wherein a total pore volume of the end portions is between 0.01 and 0.2 cc/g.

11. The honeycomb structure according to claim 10, characterized in that end portions of the partition walls contain at least one element selected from the group consisting of phosphorus (P), zirconium (Zr), silicon (Si), aluminum (Al), and titanium (Ti) in a higher content than other portions of said partition walls do.

12. A honeycomb structure which has a large number of through channels passing through in the axial direction and being partitioned with porous partition walls, characterized in that a content of phosphorus (P) in the end portions of said partition walls is larger than said content in the other portions of said partition walls;

wherein a total pore volume of the end portion is between 0.01 and 0.2 cc/g.

* * * * *